United States Patent
Chaganti et al.

(10) Patent No.: US 10,356,176 B2
(45) Date of Patent: Jul. 16, 2019

(54) PLACEMENT OF APPLICATION SERVICES IN CONVERGED INFRASTRUCTURE INFORMATION HANDLING SYSTEMS

(71) Applicant: Dell Products L.P., Round Rock, TX (US)

(72) Inventors: Ravikanth Chaganti, Bangalore (IN); Dharmesh M. Patel, Round Rock, TX (US); Rizwan Ali, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 152 days.

(21) Appl. No.: 15/436,543

(22) Filed: Feb. 17, 2017

(65) Prior Publication Data
US 2018/0241643 A1    Aug. 23, 2018

(51) Int. Cl.
*H04L 29/08* (2006.01)
*H04L 12/24* (2006.01)
*G06F 3/06* (2006.01)

(52) U.S. Cl.
CPC ............ *H04L 67/1097* (2013.01); *G06F 3/06* (2013.01); *H04L 41/0853* (2013.01); *H04L 67/322* (2013.01); *H04L 41/06* (2013.01)

(58) Field of Classification Search
CPC .................................................. H04L 67/1097
See application file for complete search history.

(56) References Cited

U.S. PATENT DOCUMENTS

| | | | | |
|---|---|---|---|---|
| 2011/0202909 | A1* | 8/2011 | Meijer | G06F 8/45 717/151 |
| 2012/0102369 | A1* | 4/2012 | Hiltunen | G06F 11/008 714/48 |
| 2016/0294728 | A1* | 10/2016 | Jain | H04L 47/82 |
| 2016/0378450 | A1* | 12/2016 | Fu | G06F 8/61 717/177 |

* cited by examiner

*Primary Examiner* — Esther B. Henderson
(74) *Attorney, Agent, or Firm* — Jackson Walker L.L.P.

(57) ABSTRACT

A system and method access domain information indicating placement domains for an information handling system. The placement domains may include fault domains and optimization domains, wherein an optimization domain includes one or more resources wherein a tier instance for each tier of a multi-tier application service resource can be instantiated such that inter-tier communication is internal to the domain. Tier instances may be placed in accordance with the placement domains to achieve compliance with high availability and performance objectives. Management endpoints corresponding to each resource may be monitored and, responsive to detecting a change in the infrastructure, updated domain information indicative of updated placement domains may be accessed and used to determine whether the placement of the tier instances achieves compliance with the objectives. If the current placement fails to achieve the objectives, the plurality of tier instances may be re-placed in accordance with the updated placement domains.

20 Claims, 10 Drawing Sheets

```
                                                                                    230
      231                                         241
       ↓                                           ↓
{                                          "OptimizationDomain" : {      ~242-1
   "FaultDomains" : {            ~232-1       "OD_a08e5640-109b-498e-a601-ffa8765e0387" : {
      "FD_a08e9d40-109b-450e-a601-ffa8d8e03877" : {   "Components" : {
         "Components" : {                                "Servers" : {    ~244-1
            "Servers" : { ~233                              "XYZ12345" : {
               "XYZ12345" : { ~235                             "Model" : "PowerEdge R630",
                  "Model" : "PowerEdge R630", ~236             "MACAddresses" : [
                  "MACAddresses" : [                              "94-65-9C-5A-B7-1D",
                     "94-65-9C-5A-B7-1D", ~237-1                  "94-65-9C-5A-B7-1C"
                     "94-65-9C-5A-B7-1C"  ~237-2               ],
                  ],                                          "Endpoint" : "172.16.100.17"
                  "Endpoint" : "172.16.100.17"             }
               }                                        }
            },        ~234                           }
            "Switches" : {                        },                     ~242-2
               "NVM12101" : {                    "OD_e8a87f3d-9877-f8f4-af13-ea013879b64b" : {
                  "Model" : "Dell Networking S4048",  "Components" : {
                  "Endpoint" : "172.16.100.101"          "Servers" : {    ~244-2
               },                                          "ABC51617" : {
               "NVM12201" : {                                 "Model" : "PowerEdge R630",
                  "Model" : "Dell Networking S4048",          "MACAddresses" : [
                  "Endpoint" : "172.16.100.102"                  "94-65-9C-5A-B7-1D",
               }                                                 "94-65-9C-5A-B7-1C"
            }                                              ],
         }                                                 "Endpoint" : "172.16.100.18"
      },                                                }
      "FD_e8aa9f3d-9417-46f4-af13-ea013c09b64b" : { ~232-2  }
         "Components" : {                           },                    ~242-3
            "Servers" : {                        "OD_e8a4242d-9877-f6f4-aa13-aa013879b64b" : {
               "ABC51617" : {                       "Components" : { ~243
                  "Model" : "PowerEdge R630",         "Chassis" : {
                  "MACAddresses" : [                     "ABC24617" : {
                     "94-65-9C-5A-B7-1D",                   "Model" : "PowerEdge FX2",
                     "94-65-9C-5A-B7-1C"                    "Servers" : {  ~244-3
                  ],                                           "XYZN1212" : {
                  "Endpoint" : "172.16.100.18"                    "Model" : "PowerEdge FC630",
               }                                                  "MACAddresses" : [
            },                                                       "94-65-9C-5A-B7-1D",
            "Switches" : {                                           "94-65-9C-5A-B7-1C"
               "NVM12101" : {                                     ]
                  "Model" : "Dell Networking S4048",           },
                  "Endpoint" : "172.16.100.101"              "XYZN1112" : {
               },                                               "Model" : "PowerEdge FC630",
               "NVM12201" : {                                   "MACAddresses" : [
                  "Model" : "Dell Networking S4048",               "94-65-9C-5B-B7-1D",
                  "Endpoint" : "172.16.100.102"                    "94-65-9C-5B-B7-1C"
               }                                                ]
            }                                              },
         }                                              "XYZN1312" : {
      },                                                   "Model" : "PowerEdge FC630",
      [ADDITIONAL FDS]                                     "MACAddresses" : [
                                                              "94-65-9D-5B-B7-1D",
                                                              "94-65-9D-5B-B7-1C"
                                                           ]
                                                        },
                                                        "XYZN1012" : {
                                                           "Model" : "PowerEdge FC630",
                                                           "MACAddresses" : [
                                                              "94-62-8C-5B-B7-1D",
                                                              "94-62-8C-5B-B7-1C"
                                                           ]
                                                        }
                                                     },
                                                     "Endpoint" : "172.16.100.2"
                                                  }
                                               }
                                            }
                                         }
                                      }
                                   }
                                }
```

FIGURE 2C

PLACEMENT OF APPLICATION SERVICES IN CONVERGED INFRASTRUCTURE INFORMATION HANDLING SYSTEMS

TECHNICAL FIELD

The present disclosure relates in general to the management of information handling systems and, more particularly, the placement of application services within the information handling system infrastructure.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The importance of information technology (IT), which refers to the use of information handling systems to acquire, access, analyze, generate, and transmit data, especially in the context of a business or other enterprise, has increased dramatically with the proliferation of broadband communication infrastructure, affordable and sophisticated network-aware mobile devices, computerized applications for business and consumers, and oceans of data generated by such applications. Data centers came into existence as enterprises heavily invested in IT quickly recognized the need to create specialized facilities and resources to house and manage information handling systems and related infrastructure and components.

The architecture of early data centers was generally silo-like or vertical, with IT resources implemented in a non-shared landscape for a specific and limited application or objective. Vertically oriented data centers typically resulted in high capital costs, high operating costs, low utilization, poor interoperability, ad hoc management, and one-dimensional security. Horizontal data centers, characterized by the use of at least some degree of virtualization and/or co-located data center facilities, evolved in response to scaling and cost issues inherent in the vertical data center model. While reducing costs and improving utilization, horizontal data centers inherited the fragmented nature of the original data centers, wherein processing resources are acquired separately from storage resources which are acquired separately from networking resources and so forth.

SUMMARY

A disclosed infrastructure services manager includes features for managing information handling systems. Although applicable to all types of information handling system, infrastructure services manager features may be described in the context of converged infrastructure systems, hyper-converged infrastructure systems, hybrid cloud systems, and other types of enterprise-scale information handling systems, all of which may be collectively or generically referred to herein as managed infrastructure systems. Disclosed infrastructure services manager features address various IT objectives including system consolidation, improved utilization of resources, and lower costs. Managed infrastructure systems support these objectives by implementing pools of compute, storage, and networking resources that can be shared by multiple applications and managed in a collective manner using policy-driven processes.

Converged infrastructure systems include information handling systems in which two or more distinct information handling resources are interconnected and validated by a vendor prior to deployment. A non-limiting example of a converged infrastructure system might comprise a modular chassis that include one or more modular compute enclosures, one or more network attached storage devices, and one or more switching resource. Hyper-converged systems include systems in which the virtualization of compute resources and the virtualization of storage resources are integrated into a software defined environment. Hyper-converged systems may be implemented as a group of off-the-shelf rack servers, each of which includes processing resources and direct attached storage resources.

Whether implemented in an enterprise's on premises data center or, increasingly, a third party data center for providing outsourced, co-located, and/or cloud-based IT resources to an enterprise, managed infrastructure systems facilitate consolidation of IT resources and simplify IT management while facilitating improvements in utilization and cost reductions. However, the introduction of readily available, managed infrastructure systems has occurred comparatively recently. Accordingly, resources and techniques for managing the building, deployment, and operation of managed infrastructure systems are yet to be fully implemented and optimized.

Subject matter disclosed in this and other applications address numerous challenges associated with ensuring that: (a) managed infrastructure systems are properly built before being deployed, (b) properly-built managed infrastructure systems are properly deployed, and (c) properly-deployed managed infrastructure systems remain operational and continue to deliver an expected level of performance.

In accordance with subject matter disclosed herein, a system and/or method access domain information indicative of placement domains within an infrastructure of an information handling system. The placement domains include one or more fault domains, wherein each fault domain includes a plurality of independently-available compute resources and one or more optimization domains, wherein each optimization domain comprises one or more compute resources within which each of a plurality of application tiers can be instantiated such that inter-tier communication is internal to the optimization domain. For each of a plurality of tiers of a multi-tier application program, a plurality of tier instances are placed within the information handling system in accordance with the placement domains to achieve compliance with one or more placement objectives.

Management endpoints corresponding to each of the information handling resources may be monitored and, responsive to detecting a change in the infrastructure or a change in a domain description document, updated domain information indicative of updated placement domains may be calculated. It may then be determined whether the placement of the tier instances achieves compliance with the one or more placement objectives. Responsive to determining that the placement fails to achieve compliance with the one or more placement objectives, the plurality of tier instances may be placed in accordance with the updated placement domains.

In at least one embodiment, application service performance is a placement objective, the placement domains include a first optimization domain, and wherein placing includes placing at least one instance of at least one of two or more application tiers on a physical compute resource within a first optimization domain. Application service dependency information indicative of strongly dependent tiers of the application service may be obtained. In such embodiments, placing may include placing at least one instance of each strongly dependent tier within the optimization domain. The application service deployment may include comprises a physical deployment or a virtual deployment. Wherein placing includes placing at least one instance of each strongly dependent tier on a distinct physical compute resource of the optimization domain.

In at least one embodiment, high availability is a second placement objective and placing includes placing at least one instance of each application tier on a first compute resource of a first fault domain and placing at least one instance of each application tier on a compute resource of the first fault domain other than the first compute resource. Prioritizing compute resources may include comprising a fault domain and an optimization domain for placing the one or more instances of the application tiers.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2C illustrates an exemplary domain discovery document;

DETAILED DESCRIPTION

Figure 1:
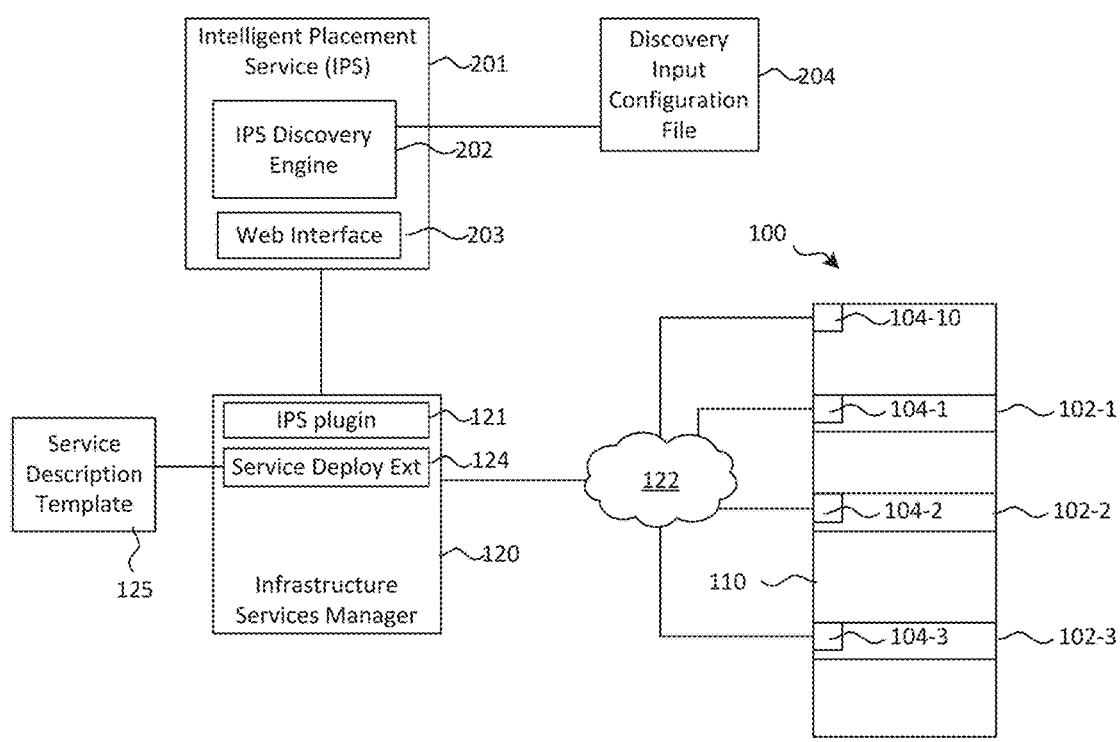
FIG. 1 illustrates a block diagram of a discovery engine for a managed infrastructure system.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, the terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), Bluetooth, ISO 14443, ISO 15693, or other suitable standard), personal area networks (PAN) (e.g., Bluetooth), local area networks (LAN), wide area networks (WAN), narrowband personal communications services (PCS), mobile telephony technologies, broadband PCS, circuit-switched cellular, cellular digital packet data (CDPD), radio frequencies, such as the 800 MHz, 900 MHz, 1.9 GHz and 2.4 GHz bands, infra-red and laser.

Turning now to the drawings, FIG. 1 illustrates a managed infrastructure environment in which a managed infrastructure system 100 is illustrated coupled to an infrastructure services manager 120. The managed infrastructure system 100 illustrated in FIG. 1 includes a plurality of information handling resources 102-1, 102-2, and 102-3 included within a rack, chassis, enclosure, or other type of structural support 110 that information handling resources 102 may share in common.

In converged infrastructure system embodiments of managed infrastructure system 100, information handling resources 102-1, 102-2, and 102-3 may each correspond to different types of information handling resources, provide different functions, and originate from different manufacturers. These disparate and heterogeneous information handling resources may be pre-configured with a validated infrastructure by a supplier or vendor. In converged infrastructure system embodiments, managed infrastructure system 100 may be referred to herein as converged infrastructure system 100.

In hyper-converged system embodiments of managed infrastructure system 100, information handling resources 102-1, 102-2, and 102-3 may represent different instances of a rack server or another off-the-shelf compute component, each of which includes compute resources and direct attached storage. These similar and homogenous information handling resources may be pre-configured with a validated infrastructure by a supplier or vendor. In hyper-converged system embodiments, managed infrastructure system 100 may be referred to herein as hyper-converged system 100. In addition, converged infrastructure system embodiments and hyper-converged system embodiments of managed infrastructure system 100 may be collectively or generically referred to herein as managed infrastructure systems 100.

Although FIG. 1 illustrates a managed infrastructure system 100 with three information handling resources 102, it will be readily appreciated that, whether implemented as a converged infrastructure system, a hyper-converged system, or another type of system, managed infrastructure system 100 may include multiple instances of information handling resources 102-1, 102-2, and/or 102-3, as well as additional types of information handling resources not depicted in FIG. 1.

Whether implemented as a converged infrastructure system, a hyper-converged system or another type of system, the infrastructure of managed infrastructure system 100 may include, in addition to the physical hardware components, any and all software and/or firmware components, including BIOS firmware, operating system software, hypervisor software, and/or containerization software, as well as any management resources on any one or more of the information handling resources 102.

FIG. 1 further illustrates a management resource 104 corresponding to each information handling resource 102, as well as a management resource 104-10 associated with structural support 110. Management resources 104, which may correspond to remote access controllers, baseboard management controllers, or the like, are illustrated coupled to a remote and centralized infrastructure services manager 120 via management network 122, which may include and/or support one or more out-of-band connections between management resources 104 and infrastructure services manager 120.

For embodiments of managed infrastructure system 100 that support virtualized, containerized, or other types of abstracted information handling resources, infrastructure services manager 120 may include or encompass resources for managing such abstracted resources. These resources may include, as examples, infrastructure manager resources, virtual machine resources, or microservice/container clustering and/or orchestration frameworks, depending upon the implementation. Infrastructure services manager 120 may include or support functionality found in any of various publically available management resources, including as non-limiting examples, Dell Active System Manager system management resources from Dell, Inc., a vCenter server and/or VMware/vSphere management resources from VMware, a subsidiary of Dell Technologies, Virtual Machine Manager (VMM)/System Center 2102 resources from Microsoft, Apache Mesos cluster management resources from the Apache Software Foundation, Kubernetes container management/orchestration resources from the Cloud Native Computing Foundation, Docker Swarm container clustering resources from Docker, Inc., and vRealize cloud automation resources from VMware/Dell Technologies.

The infrastructure services manager 120 may be configured to interact with one or more management services that may provide infrastructure services manager 120 with information or services that improve the ability of infrastructure services manager 120 to manage managed infrastructure system 100. The infrastructure services manager 120 of FIG. 1 is illustrated coupled to an intelligent placement service (IPS) 201 that includes an IPS discovery engine 202 and a web interface 203 for facilitating communication with external applications. As suggested by its name, IPS 201 may be configured to discover, learn, or otherwise determine information that facilitates the placement of application and/or storage instances and/or workloads to achieve objectives including high availability and high performance.

As depicted in FIG. 1, web interface 203 is coupled to an IPS plugin 121 of infrastructure services manager 120. The IPS plugin 121 may receive intelligent placement information from IPS discovery engine 202. In such embodiments, IPS plugin 121 may be referred to as IPS consumer plugin 121 or, more simply, IPS consumer 121.

FIG. 1 further illustrates a service deployment extension 124 configured to enable infrastructure services manager 120 to locate and retrieve one or more service description templates 125 that provide information regarding corresponding application programs. For example, service description template 125 may provide information indicative of the various tiers in a multi-tier application service and the manner in which the various tiers are related to and/or depend on one another.

Figures 2A, 2B:
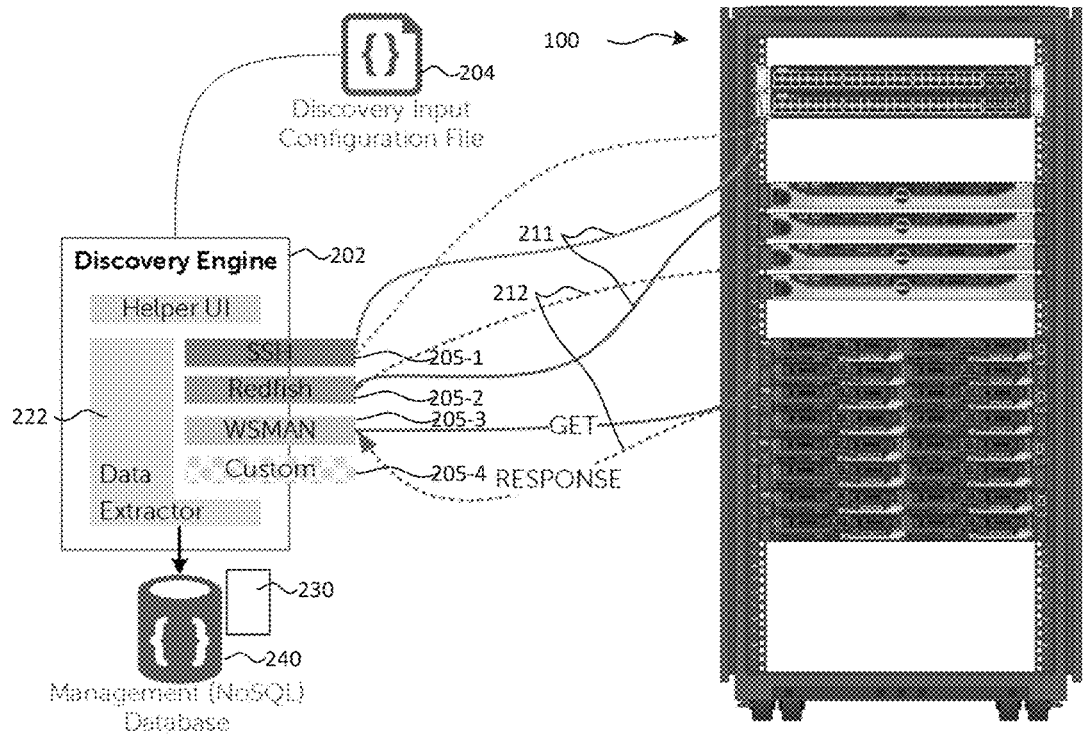
FIG. 2A illustrates the determination and identification of fault domains and optimization domains within a data center.
FIG. 2B illustrates a structure of an input configuration file.

Turning now to FIG. 2A, a managed infrastructure system 100 is illustrated coupled to a discovery engine 202, which may be implemented as an internal or plugin feature of infrastructure services manager 120. Discovery engine 202 may be configured to discover the infrastructure of managed infrastructure system 100. In at least one embodiment, discovery engine 202 may be particularly configured to discover and identify one or more types of infrastructure domains, which may influence the placement of workloads to achieve one or more deployment objectives including high availability and high performance. Examples of infrastructure domains that discovery engine 202 may discover include domains referred to herein as fault domains and optimized or performance domains. In at least one embodiment, fault domains facilitate highly available placement of resources, workloads, etc. by identifying physical devices that exhibit mutually independent operability such that, as one example, a power disruption of one device in a fault domain does not produce a power disruption of a second device of the fault domain. The discovery engine 202 illustrated in FIG. 2A is configured to access a discovery input configuration file 204. Discovery input configuration file 204 may describe various aspects of the infrastructure of managed infrastructure system 100 including the information handling resources of managed infrastructure system 100 and its infrastructure. In at least one embodiment, a format of discovery input configuration file 204 may comply with JavaScript Object Notation (JSON) or another language-agnostic format.

An exemplary JSON-formatted discovery input configuration file 204 is illustrated in FIG. 2B. As illustrated in FIG. 2B, discovery input configuration file 204 includes information handling resource type identifiers 206 identifying various types of information handling resources such as server type identifiers 206-1, network type identifiers 206-2, chassis type identifiers 206-3, etc. For each information handling resource identifier 206, discovery input configuration file 204 further includes endpoint information 207, adapter information 208, and credential information 209. Endpoint information 207 may identify one or more management resources by, for example, identifying one or more network address locations for each resource. Adapter information 208 may identify an adapter resource configured to enable discovery engine 202 to communicate various restful requests 211 to various information handling resources of managed infrastructure system 100 and receive responses 212 from the various information handling resources of managed infrastructure system 100.

Accordingly, FIG. 2A illustrates discovery engine 202 engaging in RESTful communication with target devices in the infrastructure and gathering infrastructure data including, in at least one embodiment, fault domain (FD) information and optimization domain (OD) information indicative of the fault domains and optimization domains inherent in the infrastructure of managed infrastructure system 100.

Discovery engine 202 may be configured to retrieve adapter information 208 corresponding to each type identifier 206 and to invoke the applicable discovery adapter 205 to communicate with one or more endpoints identified by endpoint information 207 of managed infrastructure system 100 to gather management data from the applicable information handling resource.

A data extractor service 222 may receive raw output from each discovery adapter 205. Data extractor service 222 may correlate or otherwise analyze the raw output to determine how information handling resources 102 and managed infrastructure system 100 are connected. After correlating the resource adapter output and identifying the fault domains and optimization domains, the data extractor service 222 may generate a domain description document 230, again compliant with a format such as JSON, that conveys the fault domain/optimization domain details of the system.

An exemplary domain description document 230 is illustrated in FIG. 2C. The illustrated domain description document includes a fault domain portion 231 identifying fault domains 232 and an optimization domain portion 241 identifying optimization domains 242. The description of fault domains 232 set forth in fault domain portion 231 identifies the servers 233 and switches 234 that comprise the corresponding fault domain 232. The description of the optimization domains 242 set forth in optimization domain portion 241 identifies chassis 243 and/or servers 244 for each optimization domain. For each instance of any type of information handling resource, the domain description document 230 includes a unique identifier 235 for each instance of a particular resource, a model description 236, and one or more media access control (MAC) addresses 237. The data extractor may store the domain description document 230 in a management database 240, which may comprise a NoSQL database.

In at least one embodiment, discovery engine 202 includes, invokes, or otherwise executes a fault domain/optimization domain identification algorithm that facilitates the identification of fault domains and optimization domains in managed infrastructure system 100. Optimization domain determinations may depend on the manner in which the multi-tiered application is deployed. Because containerized deployments can include multiple virtual machines per physical server and each virtual machine may execute a distinct tier of the multi-tier application, a single physical server can serve as an optimization domain for containerized deployments. On the other hand, because physical and virtualized deployments have a 1:1 correspondence between physical servers and application tiers, a single physical server cannot serve as an optimization domain for physical and virtualized deployments.

According to at least one embodiment of an optimization domain/fault domain determination algorithm, if a discovered endpoint is a rack server, it becomes an optimization domain for containerized deployments and a fault domain-eligible element, i.e., an independently available element that may be combined with one or more other independently available element(s) to define a high availability fault domain.

If a discovered endpoint is a modular chassis, the modular chassis is a fault domain-eligible element at the chassis level, i.e., the modular chassis and a second modular chassis may define a fault domain wherein the operability of one chassis is mutually independent with the operability of the other element. If the modular information handling resources in the chassis are interconnected with one or more I/O aggregators, the chassis is an optimization domain for physical, virtualized, and containerized deployments. On the other hand, if the information handling resources of a modular chassis are interconnected with pass-through connects, the chassis is an optimization domain only with respect to containerized deployments.

Each server blade or other server enclosure within an IO-aggregated chassis is identified as a blade level fault domain-eligible element and an optimization domain element for containerized deployments. For virtualized and physical deployments, individual blade enclosures do not constitute an optimization domain because any communication to or from the application tier instantiated on the physical blade would necessarily traverse the blade enclosure boundary.

If a discovered endpoint is a modular chassis and the chassis contains pass-through IO modules, then the chassis will be identified as a fault domain-eligible element at the blade and chassis levels. For containerized deployments, the pass-through blade and the chassis are both optimization domains. For physical deployments, neither the chassis nor the individual blade servers constitute an optimization domain.

In addition, the rack servers, modular chassis, and the switches within a given rack constitute a separate rack-level optimization domain/fault domain at least with respect to containerized deployments. For physical and virtualized deployments, the rack level system may constitute an optimization domain if the rack contains sufficient compute resources to accommodate the number of application tiers.

Figure 2D:
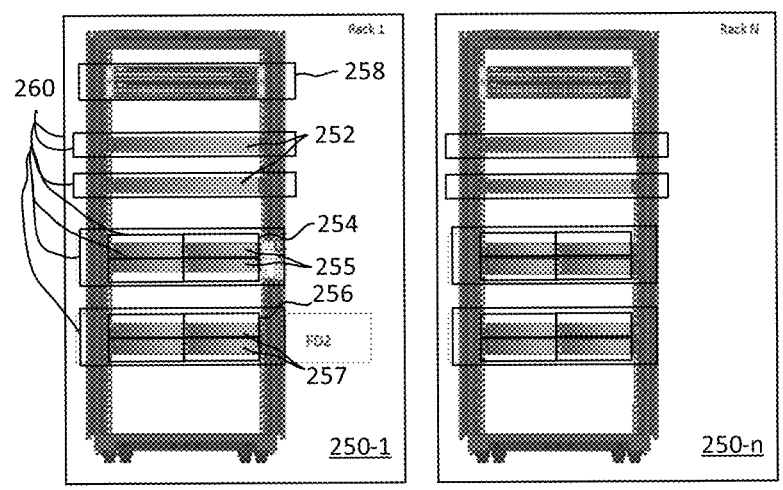
FIG. 2D illustrates optimization and fault domains discovered on a set of rack servers.

FIG. 2D illustrates two racks, 250-1 and 250-n, from a group of "n" racks in a multi-rack data center 251. Both of the racks 250 are illustrated provisioned with various components including, as non-limiting examples, one or more rack servers 252, one or more I/O aggregated modular chassis 254, i.e., a modular chassis that includes an I/O aggregator (not depicted explicitly), including one or more modular servers 255, and one or more pass-through modular chassis 256, i.e., a modular chassis that includes a pass through module, including one or more modular servers 257, as well as a "top of rack" network switch 258. FIG. 2D also illustrates domain spaces 260, each of which corresponds to an individual server or a group of multiple servers that share a common rack, chassis, or other enclosure. The domain spaces 260 illustrated in FIG. 2D include server-level domain spaces, chassis-level domain spaces, and rack-level domain spaces. Each domain space 260 may represent an FD-eligible domain space, an optimization domain space, or both, depending upon the domain determination algorithm employed, the infrastructure details, and the deployment environment, e.g., physical, virtual, or containerized.

Figure 2E:
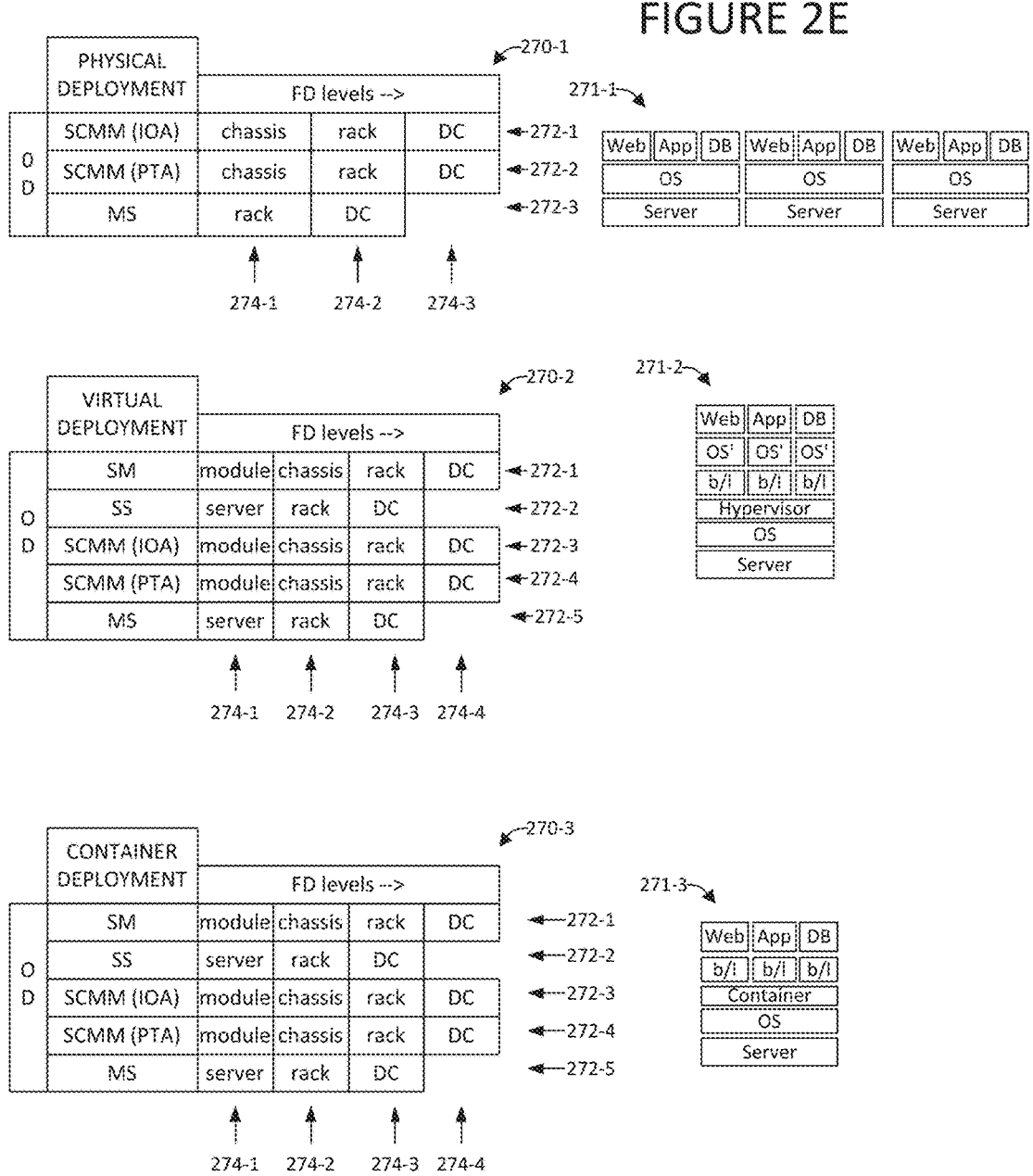
FIG. 2E illustrates matrices of optimization domains fault domains for various placement deployments of a multi-tiered application service to achieve high availability and performance objectives.

FIG. 2E illustrates optimization-fault domain matrices 270-1, 270-2, and 270-3 for pursuing domain aware placement of an exemplary multi-tier application service to achieve the best case placement consistent with performance and high availability objectives. Each optimization-fault domain matrix 270 illustrated in FIG. 2E corresponds to a different deployment environment. Specifically, optimization-fault domain matrix 270-1 corresponds to a physical deployment, an example of which is depicted as physical deployment 271-1, optimization-fault domain matrix 270-2 corresponds to a virtual deployment 271-2, and optimization-fault domain matrix 270-3 corresponds to a containerized deployment 271-3. The deployments 271 illustrate various placement of application tier instances for an example application service that includes a Web front end module, a processing module, and a database module. Other application services may include more, fewer, or different tiers or modules.

Each optimization-fault domain matrix 270 lists possible optimization domain configurations 272-1 through 272-n vertically with the top most optimization domain configuration 272-1 representing the highest performing optimization domain. Thus, as an example, the single chassis multi-module (SCMM) optimization domain 272-1, corresponding to a chassis with I/O aggregation switches, is identified as the highest performing optimization domain for a physical deployment of the exemplary multi-tier application service. The ordering of optimization domains illustrated in FIG. 2E from top to bottom may include implementation-specific details that may vary from among different implementations. As an example, although FIG. 2E differentiates between the performance of a virtualized, single server optimization domain and a virtualized SCMM/IOA optimization domain, as conveyed by the distinction between optimization domain configurations 272-2 and 272-3 in optimization-fault domain matrix 270-2, some embodiments may treat these two configurations as substantially equivalent from a performance perspective, effectively merging the distinction between optimization domain configuration 272-2 and optimization domain configuration 272-3.

Continuing with the description of the optimization-fault domain matrices 270 illustrated in FIG. 2E, a list of possible fault domain configurations 274-1 through 274-n are set forth for each optimization domain configuration 272. Each fault domain configuration listed identifies the granularity or separation of each instance of the applicable application service. For example, the fault domain configuration 274-2 associated with optimization domain configuration 272-2 (single server) for the container deployment optimization-fault domain matrix 270-3, indicates that first and second instances of the exemplary application service are placed on different racks of a single data center. This fault domain configuration represent an intermediate fault domain configuration, between the server fault domain configuration 274-1, i.e., first and second instances are placed on different servers of a single rack, and the data center (DC) fault domain configuration 274-3, i.e., first and second instances are placed in two different data centers.

An intelligent, domain-aware placement algorithm or process may access one or more data structures containing the information conveyed by the optimization-fault domain matrices 270 illustrated in FIG. 2E.

Specifically, an intelligent placement service may attempt to place two or more instances of a multi-tier application service in a manner that achieves best case fault domain configuration as well as a best case optimization domain configuration. For example, in a virtualized deployment environment, an intelligent placement process may attempt to place a first instance of the application service in a single module (SM) optimization domain configuration 272-1 and a second instance of the application service in an SM optimization domain configuration 272-2 within a different data center in accordance with the best case fault domain configuration 274-4 illustrated in FIG. 2E for optimization-fault domain matrix 270-2.

In the event that the applicable infrastructure does not support a dual best-case implementation, i.e., an implementation that achieves a best case optimization domain configuration as well as a best case fault domain configuration, the intelligent placement process may constrain one of the two parameters, performance or availability, and optimize the remaining parameter. As an example, an intelligent placement service may place a minimum constraint on performance and implement the best achievable fault domain configuration that is consistent with the performance constraint. Conversely, if availability is a paramount consideration, the intelligent placement service may constrain or require a best case fault domain configuration and place the application service instances in accordance with the best achievable optimization domain configuration.

Embodiments of an intelligent, optimization and fault domain-aware placement service may support two or more modes of placement, including a symmetric placement mode and an asymmetric placement mode. In a symmetric placement mode, the optimization domain configuration is constrained such that each instance of the application service has the same level of optimization domain configuration. If a first instance is placed within infrastructure that supports a "level 1" optimization domain configuration, i.e., the applicable optimization domain configuration 272-1, but the second instance is placed within infrastructure within which the best achievable optimization domain configuration is a level 2 configuration, the placement may force a placement of the first instance that is sub-optimal with respect to optimization domain configurations in order to achieve the desired performance symmetry between the two instances.

Conversely, an asymmetric placement approach may permit each instance of an application service to be placed in the best achievable optimization domain configuration without regard to maintaining optimization domain symmetry between or among different instances.

FIG. 2E is intentionally simplified for the sake of clarity. For example, FIG. 2E reflects an assumption that the only information handling resources available as infrastructure include rack mount servers, rack mount modular chassis, including one or more server modules, provisioned with I/O aggregation switches, and rack mount modular chassis, including one or more server modules, provisioned with pass-through I/O adapters. Those of skill in the field will recognize that a data center may employ more, fewer, or different types of information handling resources and that the intelligent placement service may be modified accordingly, in accordance with the performance and configuration characteristics of any such resource.

Similarly, although FIG. 2E illustrates a simplified view of the placement options for a multi-tier application service for any given deployment, the optimization-fault domain matrices 270 may be supplemented to reflect a greater number of achievable placements for any given deployment. For example, although optimization-fault domain matrix 270-2 indicates that there are only five possible optimization domain configurations for a virtualized deployment of the exemplary multi-tier application service, other embodiments may recognize more, fewer, and/or different optimization domain configurations for any one or more of the deployments represented by optimization-fault domain matrices 270-1, 270-2, and 270-3 In addition, although FIG. 2E reflects similarity between the virtualized optimization-fault domain matrix 270-2 and the containerized optimization-fault domain matrix 270-3, other implementations may differentiate between the optimization domain and fault domain configurations available in a virtualized deployment environment versus a containerized deployment.

FIG. 2E indicates that, regardless of the type of server resource, whether rack server, modular chassis, or blade resource, each server resource represents an optimization domain and a fault domain-eligible resource for containerized deployments of the application service. FIG. 2E further illustrates that every server resource, whether rack server, modular chassis, or chassis blade, represents a fault domain-eligible resource, but the only server resource that represents an optimization domain for physical or virtual deployments is an I/O-aggregated chassis.

The infrastructure discovery and awareness described above enables an optimized initial placement of application services. In addition, once the initial placement is complete, disclosed embodiments may monitor for any changes in the infrastructure and, upon detecting any one or more particular infrastructure changes, trigger a fault domain/optimization domain re-calculation and a re-determination of placement for some or all application services managed by the management resource.

Accordingly, embodiments may monitor a managed infrastructure system for infrastructure changes, including changes associated with a faulty endpoint and re-discover the infrastructure and re-execute optimization domain/fault domain identification in a proactive manner following a detected infrastructure change. A management database may be updated and IPS consumers notified.

Figure 2F:
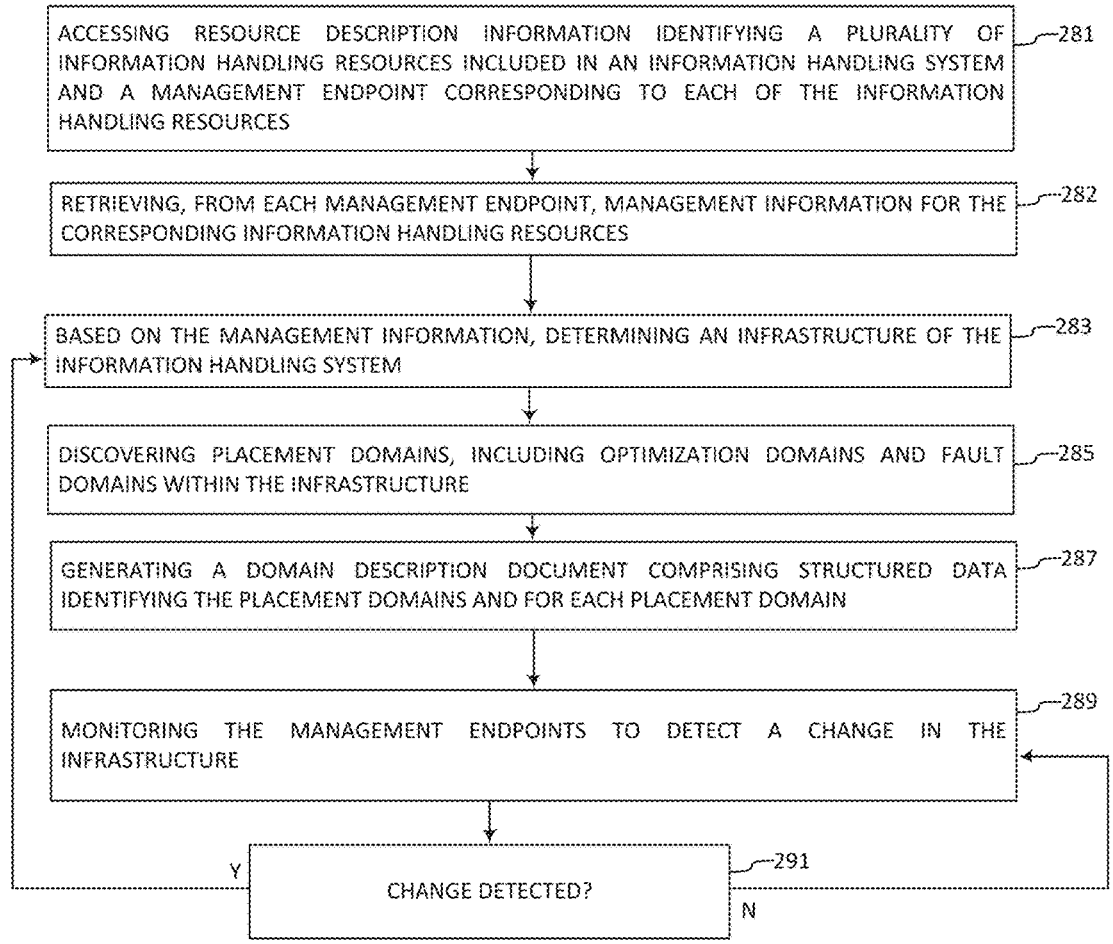
FIG. 2F illustrates a flow diagram of a method for discovering optimization and fault domains in an infrastructure managed system.

FIG. 2F illustrates a flow diagram of a method 280 for discovering and dynamically maintaining optimization and fault domain information for an infrastructure managed system. The method 280 illustrated in FIG. 2F includes accessing (block 281) resource description information. The resource description information may identify a plurality of information handling resources included in the infrastructure managed system and a management endpoint corresponding to each of the information handling resources. For each management endpoint, management information may be retrieved (block 282) for the corresponding information handling resource. Based on the management information, an infrastructure of the information handling system may be determined (block 283). Placement domains, including optimization domains and fault domains, may be discovered (block 285) within the infrastructure and a domain description document (block 287) that includes structured data identifying the placement domains for each placement domain may be generated. The management endpoints may be monitored (block 289) to detect any change in the infrastructure. Upon detecting an infrastructure change (block 291), the method 280 illustrated in FIG. 2F may return to block 283 to re-determine the infrastructure and the corresponding placement domains.

Figure 2G:
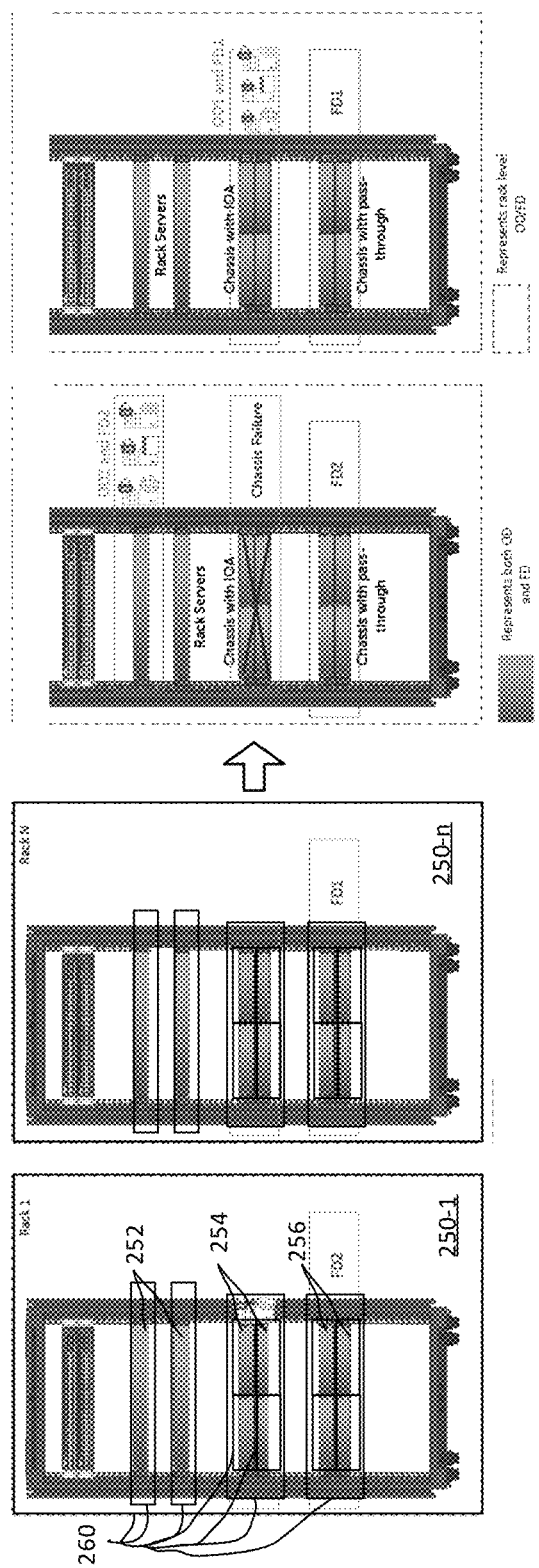
FIG. 2G illustrate a dynamic change of domains following a failure of an information handling resource.

FIG. 2G illustrates the multi-rack data center of FIG. 2 before and after an unintended infrastructure change corresponding to a failure of a modular chassis in RACK 1. FIG. 2G illustrates that OD2 and FD2 have been re-defined following the modular chassis failure.

Figure 3A:
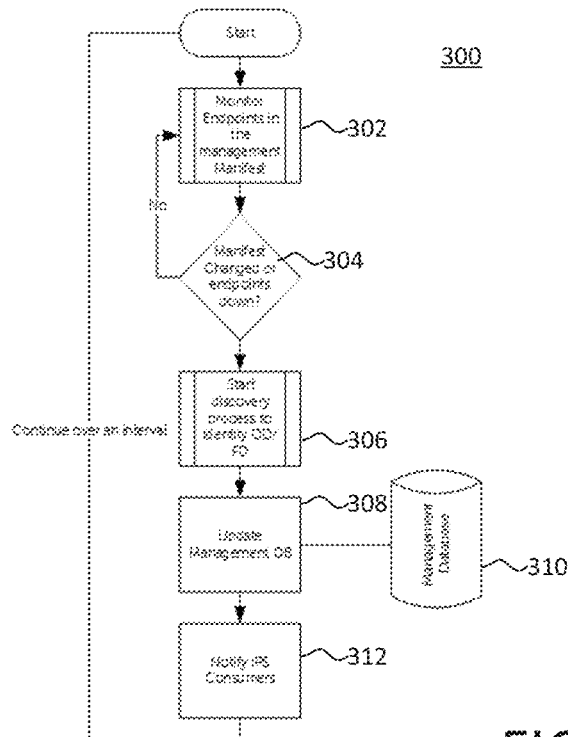
FIG. 3A illustrate a method for monitoring for infrastructure changes and re-determining optimization and fault domains when an infrastructure change is detected.
Figure 3B:
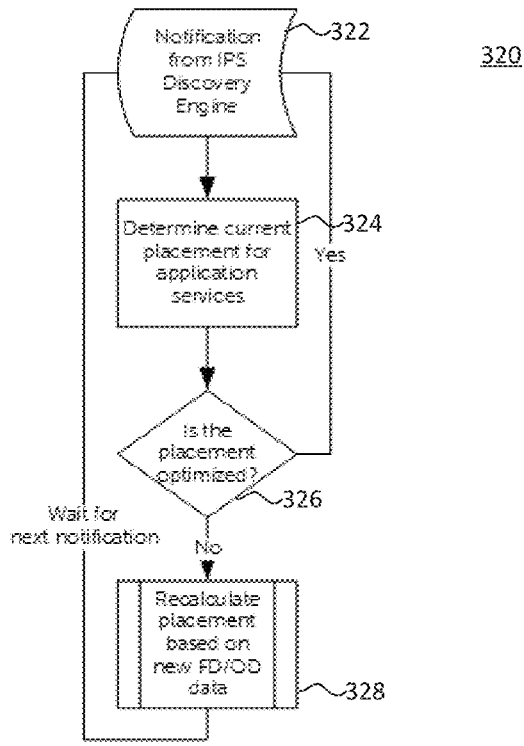
FIG. 3B illustrates a method for monitoring the placement of application services and recalculating placements when fault domains and optimization domains are updated.

FIG. 3A illustrates a flow diagram of an example method 300 and FIG. 3B illustrates a flow diagram of an example method 320 encompassing these operations. The method 300 illustrated in FIG. 3A includes monitoring (block 302) management endpoints indicated in the management manifest, and determining (block 304) whether any manifest changes have occurred or any endpoints have stopped functioning. If manifest changes have occurred or end point functionality has changed, method 300 proceeds to block 306, in which a discovery process is started to identify optimization domains and fault domains. Any or all optimization domains and/or fault domains discovered may be recorded by updating (block 308) the management database, illustrated in FIG. 3A as management database 310. After the management database update completes, the method 300 illustrated in FIG. 3A may notify (block 312) IPS consumers.

FIG. 3B illustrates a flow diagram for an example method 320 for placing application services in accordance with fault and optimization domains. As illustrated in FIG. 3B, the placement of application services may begin when notification is received (block 322) from an IPS discovery engine. The infrastructure services manager may then determine (block 324) the current placement of application services and determine (block 326) whether the placement is optimized. If the placement is not optimized, the method 320 illustrated in FIG. 3B recalculates (block 328) the placement of application services when new fault domain/optimization domain data is received.

Figure 4A:
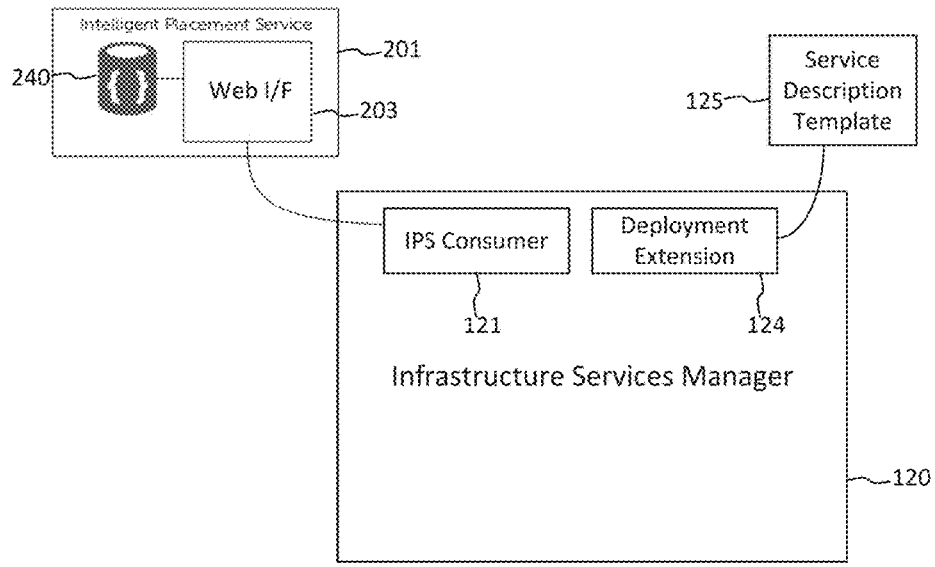
FIG. 4A illustrates a block diagram of infrastructure-aware and application service-aware placement resources.

FIG. 4A illustrates a configuration for placing application services in conjunction with infrastructure awareness provided via intelligent placement service 201 and application service awareness provided via service template definition 125. As depicted in FIG. 4A, infrastructure service manager 120 includes IPS consumer 121 and a service deployment plugin 124. IPS consumer 121 is illustrated coupled, by way of Web interface 203 of intelligent placement service 201 to a domain description document or infrastructure manifest in management database 240. Service description template 125 is illustrated coupled to a services deployment extension plugin 124 of infrastructure services manager 120.

The infrastructure services manager 120 may interface with IPS consumer 121 to retrieve a domain description document from management database 240. In addition, infrastructure services manager 120 may access service description template 125 via deployment extension 124. For example, in embodiments that include Dell Active System Manager features within infrastructure service manager 120, service tier level dependency information may be retrieved from multi-tier service definitions in service description template 125. As another example applicable to embodiments that include vRealize/VMware features in infrastructure service manager 120, application service definitions may be contained within application service blueprints. Since IPS consumer 121 has knowledge of underlying infrastructure via management database 240, IPS consumer 121 can infer dependencies from deployed instances. This information may then be used, along with optimization and fault domain information from a domain description document or other information in management database 240, to place application service instances.

Figure 4B:
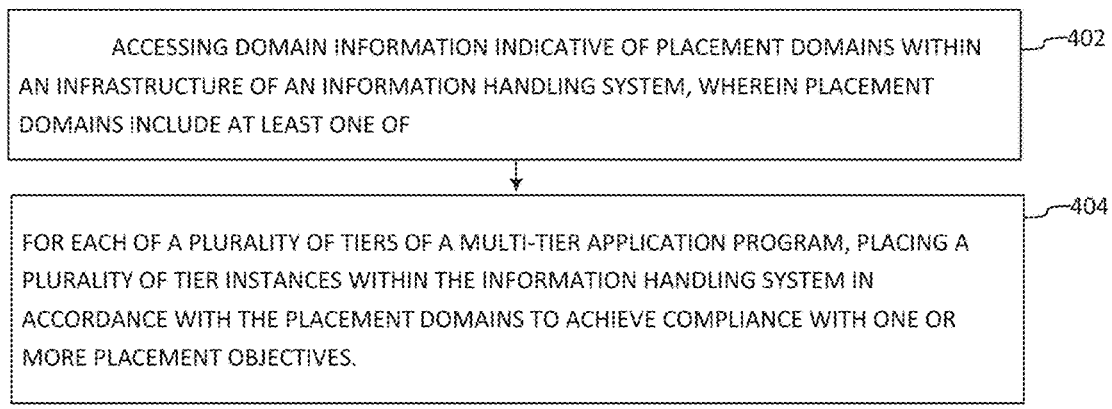
FIG. 4B illustrates a flow diagram of a method of placing application services in an infrastructure aware and service aware manner.

FIG. 4B is a flow diagram of a method 400 for placing instances of a multi-tier application service. The method 400 illustrated in FIG. 4B includes accessing (block 402) domain information indicative of placement domains within an infrastructure of an information handling system. In this context, placement domains may include optimization domains, fault domains, or both, as well as other types of domain structures that may be applicable to optimized placement. For each of the two or more tiers that a multi-tier application program may have, the method 400 illustrated in FIG. 4B may place (block 404) a plurality of tier instances within the information handling system in accordance with the placement domains to achieve compliance with one or more placement objectives including, as non-limiting examples, high availability and high performance including low inter-tier communication latency.

Figure 4C:
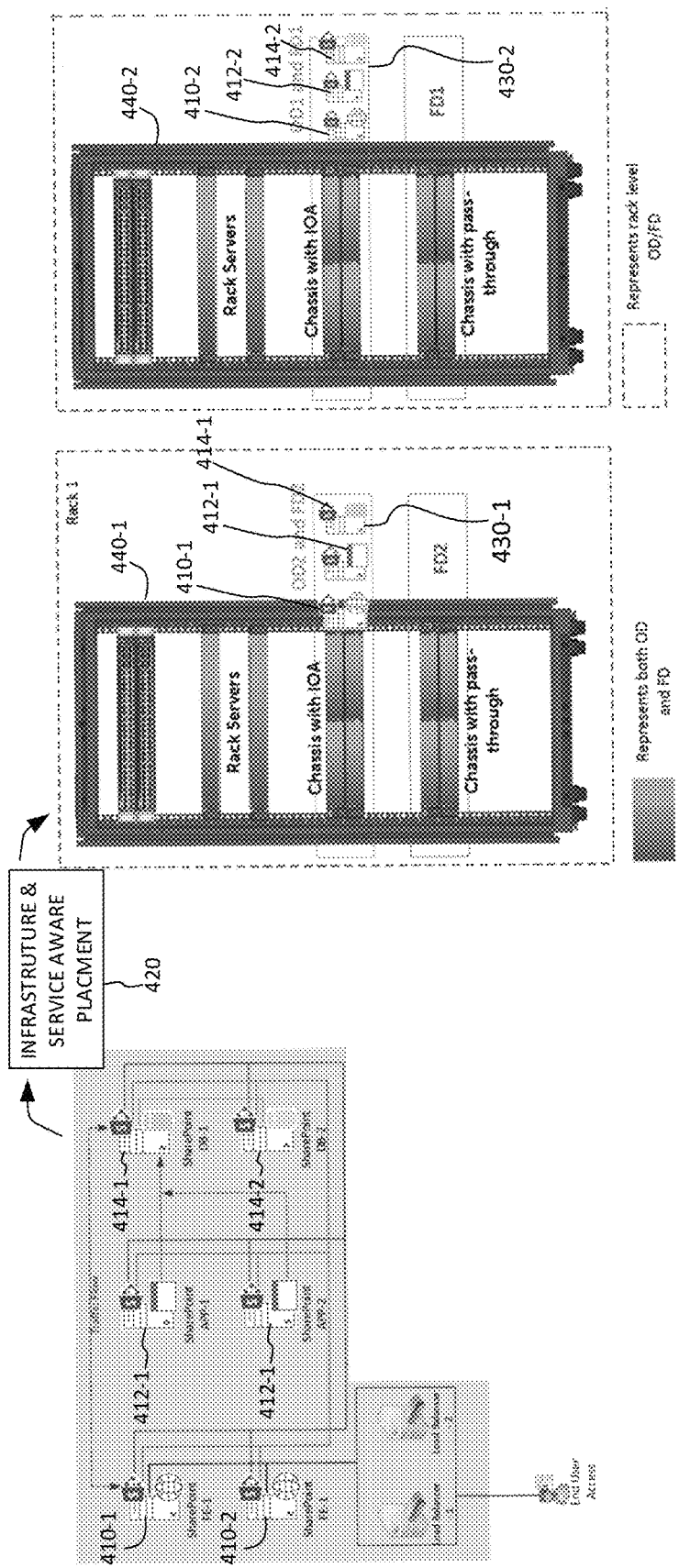
FIG. 4C illustrates the domain-based placement of tier instances of a multi-tier application service.

FIG. 4C illustrates the placement of tier instances of an example multi-tier application service within a multi-rack data center wherein service level dependencies are conveyed to an infrastructure services manager, and considered along with the OD/FD information and other infrastructure information, to place one or more instances of each tier of the multi-tier application. As illustrated in FIG. 4C, the example application includes a user interface module 410, a processing module 412, and a database module 414. To achieve high availability, FIG. 4C illustrates an implementation in which two (or more) instances of each tier of the application service are placed on the applicable group of resources. Thus, FIG. 4C illustrates a first instance of user interface module 410-1, a second instance of user interface module 410-2, and so forth.

Based on service information from service template 125 (FIG. 4A) identifying the application's different tiers and indicating the manner in which the tiers communicate with one another, combined with infrastructure information from a domain description document 230 (FIG. 2A) or other information from management database 240, FIG. 4C illustrates the service-aware and domain/infrastructure aware placement (block 420) of instances of a multi-tier application service. In the placement illustrated in FIG. 4C, the first instance of each tier of the application service is placed on an optimization domain/fault domain 430-1 on a first rack 440-1 of a data center while second instances of each tier of the application service are placed on an optimization domain/fault domain 430-2 on a second rack 440-2 of the data center.

IPS consumer 121 (FIG. 4A) may also use the infrastructure manager interfaces to account for clustered infrastructures. This is significant at least because an infrastructure cluster may or may not span two or more racks 440. If a clustered infrastructure spans two or more racks in a data center, the domain-based placement of application services may leverage a multi-rack optimization within the clustered infrastructure.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling resource management method comprising:

accessing domain information for an infrastructure comprising one or more information handling resources, wherein the domain information is indicative of placement domains for a multi-tier application comprising a plurality of application tiers, wherein the placement domains include:

one or more fault domains, wherein each fault domain includes a plurality of independently-available compute resources; and one or more deployment-dependent optimization domains, wherein each deployment-dependent optimization domain comprises one or more compute resources within which each of the plurality of application tiers can be instantiated such that inter-tier communication is internal to the deployment-dependent optimization domain; and wherein each of the one or more deployment-dependent optimization domains is selected from:

a containerized optimization domain for a containerized deployment of the multi-tier application;

a virtualized optimization domain for a virtualized deployment of the multi-tier application; and a physical optimization domain for a physical deployment of the multi-tier application; and wherein the containerized deployment permits placement of two or more tiers of the multi-tier application on a single physical compute resource and wherein the physical deployment prohibits two or more tiers of the multi-tier application from executing on a single physical resource; and placing one or more instances of each of the plurality of application tiers within the infrastructure in accordance with the placement domains to achieve compliance with one or more placement objectives.

2. The method of claim 1, further comprising:
monitoring management endpoints corresponding to each of the information handling resources and responsive to detecting a change in the infrastructure:
accessing updated domain information indicative of updated placement domains;
determining whether the placing achieves compliance with the one or more placement objectives; and
responsive to determining that the placing fails to achieve compliance with the one or more placement objectives, placing the plurality of application tiers in accordance with the updated placement domains.

3. The method of claim 1, wherein application service performance is a placement objective, the placement domains include a first deployment-dependent optimization domain, and wherein placing includes:
placing at least one instance of at least one of two or more application tiers on a physical compute resource within a first deployment-dependent optimization domain.

4. The method of claim 3, further comprising:
obtaining application service dependency information indicative of strongly dependent tiers of the multi-tier application, wherein placing includes placing at least one instance of each strongly dependent tier within the first deployment-dependent optimization domain.

5. The method of claim 4, wherein the placing comprises:
symmetric placing of the plurality of applications tiers, wherein symmetric placing includes placing all instances of the multi-tier application at the same level of optimization.

6. The method of claim 4, wherein high availability is a second placement objective and wherein placing includes:
placing at least one instance of each application tier on a first compute resource of a first fault domain; and
placing at least one instance of each application tier on a compute resource of the first fault domain other than the first compute resource.

7. The method of claim 6, further comprising:
prioritizing compute resources comprising a fault domain and a deployment-dependent optimization domain for placing the one or more instances of each of the plurality of application tiers.

8. An information handling resource comprising:
a processor;
an interface for communicating with management endpoints of a plurality of management information handing resources;
a nontransitory computer readable medium including processor executable program instructions that, when executed, cause the processor to perform operations including:
accessing domain information for an infrastructure comprising one or more information handling resources, wherein the domain information is indicative of placement domains for a multi-tier application comprising a plurality of application tiers, wherein the placement domains include:
one or more fault domains, wherein each fault domain includes a plurality of independently-available compute resources; and
one or more deployment-dependent optimization domains, wherein each deployment-dependent optimization domain comprises one or more compute resources within which each of the plurality of application tiers can be instantiated such that inter-tier communication is internal to the deployment-dependent optimization domain; and
wherein each of the one or more deployment-dependent optimization domains is selected from:
a containerized optimization domain for a containerized deployment of the multi-tier application;
a virtualized optimization domain for a virtualized deployment of the multi-tier application; and
a physical optimization domain for a physical deployment of the multi-tier application; and
wherein the containerized deployment permits placement of two or more tiers of the multi-tier application on a single physical compute resource and wherein the physical deployment prohibits two or more tiers of the multi-tier application from executing on a single physical resource; and
for each of the plurality of application tiers, placing one or more instances of each of the plurality of application tiers within the infrastructure in accordance with the placement domains to achieve compliance with one or more placement objectives.

9. The information handling resource of claim 8, wherein the operations include:
monitoring management endpoints corresponding to each of the one or more information handling resources and responsive to detecting a change in the infrastructure:
accessing updated domain information indicative of updated placement domains;
determining whether the placing achieves compliance with the one or more placement objectives; and
responsive to determining that the placing fails to achieve compliance with the one or more placement objectives, placing the plurality of application tiers in accordance with the updated placement domains.

10. The information handling resource of claim 8, wherein application service performance is a placement objective, the placement domains include a first deployment-dependent optimization domain, and wherein placing includes:
placing at least one instance of each of two or more application tiers on a compute resource within a first deployment-dependent optimization domain.

11. The information handling resource of claim 10, wherein the operations include:
obtaining application service dependency information indicative of strongly dependent tiers of the multi-tier application, wherein placing includes placing at least one instance of each strongly dependent tier within the deployment-dependent optimization domains.

12. The information handling resource of claim 11, wherein the placing comprises:
symmetric placing of the plurality of applications tiers, wherein symmetric placing includes placing all instances of the multi-tier application at the same level of optimization.

13. The information handling resource of claim 11, wherein high availability is a second placement objective and wherein placing includes:

placing at least one instance of each application tier on a first compute resource of a first fault domain; and placing at least one instance of each application tier on a compute resource of the first fault domain other than the first compute resource.

14. The information handling resource of claim 13, wherein the operations include:

prioritizing compute resources comprising a fault domain and an deployment-dependent optimization domain for placing the one or more instances of each of the plurality of application tiers.

15. A non-transitory computer readable medium including processor-executable program instructions that, when executed by a processor, cause the processor to perform operations comprising:

accessing domain information for an infrastructure comprising one or more information handling resources wherein the domain information is indicative of placement domains for a multi-tier application comprising a plurality of application tiers, wherein the placement domains include:

one or more fault domains, wherein each fault domain includes a plurality of independently-available compute resources; and one or more deployment-dependent optimization domains, wherein each deployment-dependent optimization domain comprises one or more compute resources within which each of the plurality of application tiers can be instantiated such that intertier communication is internal to the deployment-dependent optimization domain; and wherein each of the one or more deployment-dependent optimization domains is selected from:

a containerized optimization domain for a containerized deployment of the multi-tier application;

a virtualized optimization domain for a virtualized deployment of the multi-tier application; and a physical optimization domain for a physical deployment of the multi-tier application; and wherein the containerized deployment permits placement of two or more tiers of the multi-tier application on a single physical compute resource and wherein the physical deployment prohibits two or more tiers of the multi-tier application from executing on a single physical resource; and for each of the plurality of application tiers, placing one or more instances of each of the plurality of application tiers within the infrastructure in accordance with the placement domains to achieve compliance with one or more placement objectives.

16. The non-transitory computer readable medium of claim 15, wherein the operations include:

monitoring management endpoints corresponding to each of the information handling resources and responsive to detecting a change in the infrastructure:

accessing updated domain information indicative of updated placement domains;

determining whether the placing achieves compliance with the one or more placement objectives; and responsive to determining that the placing fails to achieve compliance with the one or more placement objectives, placing the plurality of application tiers in accordance with the updated placement domains.

17. The non-transitory computer readable medium of claim 15, wherein application service performance is a placement objective, the placement domains include a first deployment-dependent optimization domain, and wherein placing includes:

placing at least one instance of each of two or more application tiers on a compute resource within a first deployment-dependent optimization domain.

18. The non-transitory computer readable medium of claim 17, wherein the operations include:

obtaining application service dependency information indicative of strongly dependent tiers of the multi-tier application, wherein placing includes placing at least one instance of each strongly dependent tier within the deployment-dependent optimization domains.

19. The non-transitory computer readable medium of claim 18, wherein the multi-tier application is deployed physical or virtual deployment and wherein placing includes placing at least one instance of each strongly dependent tier on a distinct compute resource of the deployment-dependent optimization domains.

20. The non-transitory computer readable medium of claim 17, wherein high availability is a second placement objective and wherein placing includes:

placing at least one instance of each application tier on a first compute resource of a first fault domain; and placing at least one instance of each application tier on a compute resource of the first fault domain other than the first compute resource.

* * * * *